(12) United States Patent
Zhou et al.

(10) Patent No.: US 11,652,531 B2
(45) Date of Patent: May 16, 2023

(54) TECHNIQUES FOR DETERMINING ONE OR MORE ANTENNA PANELS TO USE IN RECEIVING BEAMS

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/498,567

(22) Filed: Oct. 11, 2021

(65) Prior Publication Data

US 2022/0116095 A1 Apr. 14, 2022

Related U.S. Application Data

(60) Provisional application No. 63/090,563, filed on Oct. 12, 2020.

(51) Int. Cl.
*H04B 7/06* (2006.01)
*H04W 72/044* (2023.01)
*H04W 72/04* (2023.01)
*H04B 7/08* (2006.01)

(52) U.S. Cl.
CPC ........... *H04B 7/0695* (2013.01); *H04B 7/088* (2013.01); *H04W 72/042* (2013.01); *H04W 72/046* (2013.01)

(58) Field of Classification Search
CPC .... H04B 7/0695; H04B 7/088; H04B 7/0452; H04B 7/0874; H04B 7/0408; H04W 72/042; H04W 72/046; H04L 5/0023; H04L 5/0035; H04L 5/0048
See application file for complete search history.

(56) References Cited

U.S. PATENT DOCUMENTS

| | | | |
|---|---|---|---|
| 2019/0103908 A1* | 4/2019 | Yu | H04B 7/0695 |
| 2019/0306850 A1* | 10/2019 | Zhang | H04B 7/0465 |
| 2021/0051710 A1* | 2/2021 | Cirik | H04W 74/0833 |
| 2021/0119688 A1* | 4/2021 | Enescu | H04B 7/0695 |

(Continued)

FOREIGN PATENT DOCUMENTS

WO 2019193581 A2 10/2019

OTHER PUBLICATIONS

Huawei, et al., "Discussion on Panel ID and Usage", 3GPP Draft, 3GPP TSG RAN WG1 Meeting #97, R1-1907553, 3rd Generation Partnership Project (3GPP), RAN WG1, No. Reno, USA, May 13, 2019-May 17, 2019 May 13, 2019 (May 13, 2019), XP051728986, 5 Pages, URL: http://www.3gpp.org/ftp/Meetings%5F3GPP% 5FSYNC/RAN1/Docs/R1%2D1907553%2Ezip [retrieved on May 13, 2019] Paragraph [2.2.1]-Paragraph [2.2.1], Sections 1-3.

(Continued)

*Primary Examiner* — Kenneth T Lam
(74) *Attorney, Agent, or Firm* — ArentFox Schiff LLP

(57) ABSTRACT

Aspects described herein relate to determining one of multiple antenna panels to use to receive downlink beams based on whether a configuration from a base station indicates an antenna panel associated with the downlink beam or in determining a number of repetitions of a downlink beam to receive in beam refinement.

26 Claims, 10 Drawing Sheets

(56) References Cited

U.S. PATENT DOCUMENTS

2022/0123815 A1* 4/2022 Karjalainen ........... H04B 7/024
2022/0123818 A1* 4/2022 Li ....................... H04B 7/0695
2022/0190902 A1* 6/2022 Zhang ................ H04W 56/001

OTHER PUBLICATIONS

International Search Report and Written Opinion—PCT/US2021/054608—ISA/EPO—Feb. 11, 2022.
VIVO: "Further Discussion on Multi-Beam Operation", 3GPP Draft, 3GPP TSG RAN WG1 #98, R1-1908167_Further Discussion on Multi-Beam Operation, 3rd Generation Partnership Project (3GPP), RAN WG1, No. Prague, CZ, Aug. 26, 2019-Aug. 30, 2019 1 (Aug. 17, 2019), XP051764786, 12 Pages, URL: http://www.3gpp.org/ftp/tsg_ran/WG1_RL1/TSGR1_98/Docs/R1-1908167.zip [retrieved on Aug. 17, 2019] Paragraph [3.ULpanelspecifictransmission].

* cited by examiner

TECHNIQUES FOR DETERMINING ONE OR MORE ANTENNA PANELS TO USE IN RECEIVING BEAMS

CLAIM OF PRIORITY UNDER 35 U.S.C. § 119

The present Application for Patent claims priority to Provisional Patent Application No. 63/090,563, entitled "TECHNIQUES FOR DETERMINING ONE OR MORE ANTENNA PANELS TO USE IN RECEIVING BEAMS" filed Oct. 12, 2020, which is assigned to the assignee hereof and hereby expressly incorporated by reference herein for all purposes.

TECHNICAL FIELD

The present disclosure relates generally to wireless communication systems, and more particularly, to techniques for receiving and reporting beams using one or more antenna panels.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support beamforming where a first device (for example, a base station and user equipment (UE)) may beamform communication signals by selectively applying power to antenna resources to generate a signal transmission or signal reception in a spatial direction of a second device. In 5G NR, for example, the base station may configure the UE with information for determining beams that may be used in communicating with the base station. The configuration may include a radio resource control (RRC) configuration of enabled transmission configuration indicator (TCI) states, and the base station may signal, within a resource grant, which of the enabled TCI states the UE is to use in communicating with the base station.

In addition, the UE may be configured to perform beam refinement to refine at least a receive beam based on an aperiodic channel state information (CSI)-reference signal (RS) configured by the base station. As part of beam refinement, the base station may transmit the CSI-RS over configured resources, and the UE may measure the CSI-RS using one or more of the configured beams (as indicated in the TCI state configuration or scheduling for the CSI-RS). The UE may report the CSI-RS measurement to the base station so the base station may potentially modify at least the receive beam of the UE. This may be referred to as P3 Rx beam refinement in 5G NR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of the disclosure, a method, a computer-readable medium, and an apparatus are provided. In some aspects, the method includes determining, based on whether a beam indication configuration received from a base station associates a downlink beam with an antenna panel, one of a plurality of antenna panels to use in measuring the downlink beam, receiving, from the base station, a downlink (DL) reference signal (RS) from the downlink beam, and measuring, at the one of the plurality of antenna panels, a signal metric of the downlink beam based on receiving the DL RS.

In another aspect, a method includes determining one of a plurality of antenna panels to use in measuring a downlink beam, receiving, from the base station, a plurality of repetitions of a DL RS from the downlink beam, and measuring, at the one of the plurality of antenna panels, a signal metric of the downlink beam based on receiving the plurality of repetitions of the DL RS.

In another aspect, a method includes transmitting, to a user equipment (UE), a configuration indicating a parameter for determining one of a plurality of antenna panels to use in measuring a signal metric of a downlink beam from the base station based on whether a beam indication configuration transmitted by the base station indicates an association between the downlink beam and an antenna panel of the UE, and transmitting, by the base station, a DL RS using the downlink beam to the UE.

In another aspect, a method includes transmitting, to a UE, a configuration indicating a parameter for determining one of a plurality of antenna panels to use in measuring a signal metric of a downlink beam from a base station, and transmitting, by the base station, a plurality of repetitions of a DL RS using the downlink beam to the UE based on the configuration.

In another aspect, a method includes receiving, from a base station, a beam indication configuration that associates a plurality of downlink beams with a plurality of antenna panels associated with the UE, receiving, from the base station, via a first antenna panel of the plurality of antenna panels, based on whether the beam indication configuration associates a downlink beam of the plurality of downlink beams with the first antenna panel, a DL RS via the downlink beam, performing one or more measurements of the downlink beam based on receiving the DL RS, and one of transmitting, to the base station, a beam report including the one or more measurements of the downlink beam, or performing, based on the one or more measurements, a beam refinement operation using the downlink beam.

In another aspect, a method includes transmitting, to a UE, a beam indication configuration that associates a plurality of downlink beams with a plurality of antenna panels at the UE, transmitting, to the UE, a beam report configuration indicating a parameter for determining, based on the beam indication configuration, one of the plurality of antenna panels at the UE to use in performing one or more measurements of a downlink beam from the base station, and transmitting, by the base station, a DL RS using the downlink beam to the UE.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

DETAILED DESCRIPTION

Figure 1:
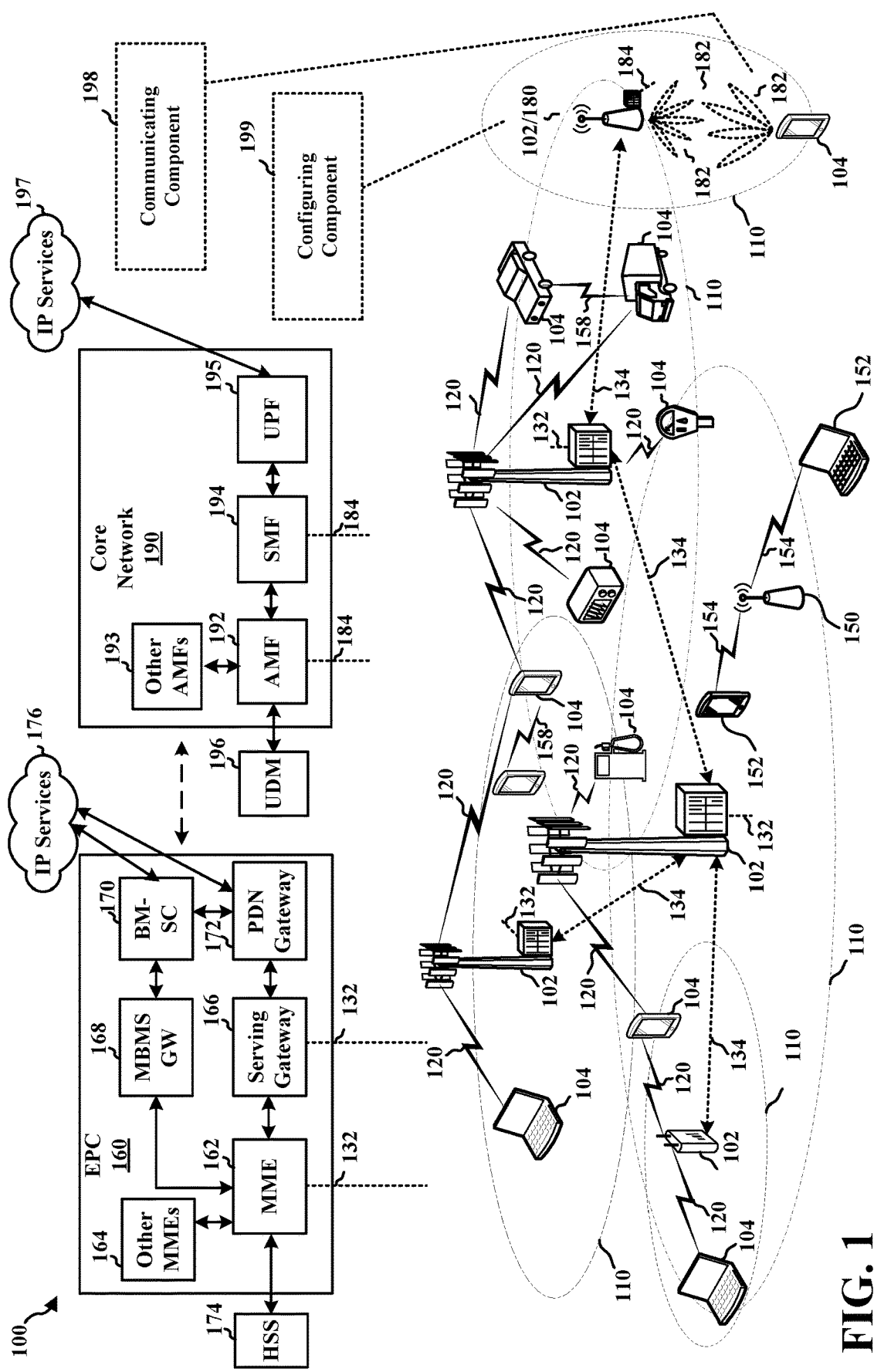
FIG. 1 is a diagram illustrating an example of a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

A UE may be equipped with multiple panels or arrays of antennas positioned at different positions in or on the UE, or facing different directions, for improved communication diversity. The UE may define one or more virtual antenna panels that are based on (for example, include) one or multiple (or portions of) the panels or arrays on the UE. In other words, each virtual antenna panel may include (or may map to) one or more, or a portion of one or more, physical antenna panels. In some examples, all antennas in an antenna panel may share the same timing advance (TA) or power control (PC). In the following description, a physical antenna panel and a virtual antenna panel may both be referred to generally as an "antenna panel." As such, any reference to an antenna panel may refer to a physical antenna panel or a virtual antenna panel. Each antenna panel, whether physical or virtual, may be associated with a respective antenna panel identifier.

Various aspects relate generally to techniques for determining an antenna panel identifier of one of multiple antenna panels at a UE that corresponds to a configured beam. Additional aspects relate generally to techniques for performing beam refinement. In some examples, a UE with multiple antenna panels may determine which antenna panel is to be used with a given configured beam, which can be applied for transmitting communications, receiving communications, or a combination thereof. In some examples, the base station may configure one of the multiple antenna panels with a transmission configuration indicator (TCI) state that indicates a beam, and the UE may accordingly determine the configured antenna panel based on the configured TCI state or may determine whether to use the configured antenna panel or another antenna panel for the beam. In other examples, the base station may not configure an antenna panel for a beam, and the UE may determine whether to use a previously configured antenna panel or another antenna panel for the beam.

In other examples, a UE may determine which of multiple antenna panels to use in performing beam refinement based on a reference signal configuration. For example, the base station may schedule a reference signal for performing beam refinement, such as an aperiodic channel state information (CSI)-reference signal (RS). The UE or base station may determine which of multiple antenna panels to use in measuring and reporting the CSI-RS for beam refinement. For example, if a scheduling offset between a scheduling grant for the reference signal and the reference signal itself does not exceed a threshold offset, the UE or base station may determine to use only antenna panels that are active when receiving the scheduling grant to measure and report the reference signal. Alternatively, if the scheduling offset exceeds the threshold offset, the UE or base station may determine to use all or additional antenna panels to measure and report the reference signal.

Particular implementations of the subject matter described in this disclosure may be implemented to realize one or more of the following potential advantages. In some aspects of the present disclosure, the described apparatus and methods may allow the UE to determine which antenna panel to use for a beam in cases where an identifier of the antenna panel is, or is not, signaled in a configuration for the beam. In this case, the described apparatus and methods may provide some flexibility in UE implementation to select a desirable antenna panel in certain conditions, or may reduce signaling overhead where the base station does not configure the antenna panel. In addition, in some aspects, the described apparatus and methods, by determining which antenna panels to use in beam refinement, may limit the number of possible antenna panels when the scheduling offset is within the threshold. In this case, the described apparatus and methods may avoid refinement using antenna panels that may not be relevant to the received reference signal, or may expand the number of possible antenna panels to provide greater diversity when the scheduling offset exceeds the threshold.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communications system 100. The wireless communications system 100 (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming to generate beamformed signals 182 (also referred to as "beams") with the UE 104 to compensate for the extremely high path loss and short range. The base station 180 and the UE 104 may each include a plurality of antennas, such as antenna elements, antenna panels, or antenna arrays to facilitate the beamforming. Though base station 102 and mmW base station 180 are separately shown, aspects described herein with respect to a base station 102 may relate to, and be implemented by, a mmW base station 180.

The base station 180 may transmit a beamformed signal to the UE 104 in one or more transmit directions. The UE 104 may receive the beamformed signal from the base station 180 in one or more receive directions. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMEs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a communicating component 198 configured to determine at least one of multiple antenna panels to use with a configured beam or performing beam refinement using at least a portion of the multiple antenna panels. In some aspects, the base station 102 may include a configuring component 199 configured to indicate at least one of multiple antenna panels to use with a configured beam or determine which of the multiple antenna panels are used for performing beam refinement. Although the following description may be described in terms of 5G NR and related features, the concepts described herein may be applicable to other areas or wireless communication technologies, such as LTE, LTE-A, CDMA, global system for mobile communication (GSM), or future communications standards or technologies.

Figure 2B:
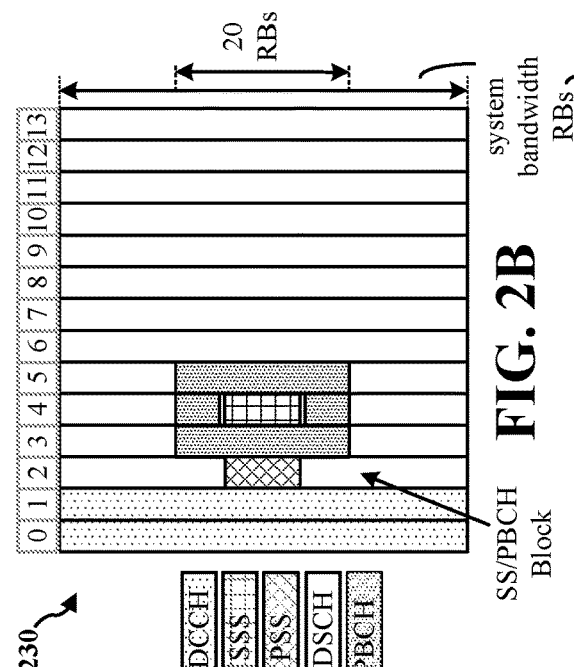
FIGS. 2A, 2B, 2C, and 2D are diagrams illustrating examples of a first fifth generation (5G)/new radio (NR) frame including an expanded view of a subframe, downlink (DL) channels within a 5G/NR subframe, a second 5G/NR frame including an expanded view of a subframe, and uplink (UL) channels within a 5G/NR subframe, respectively.
Figure 2D:
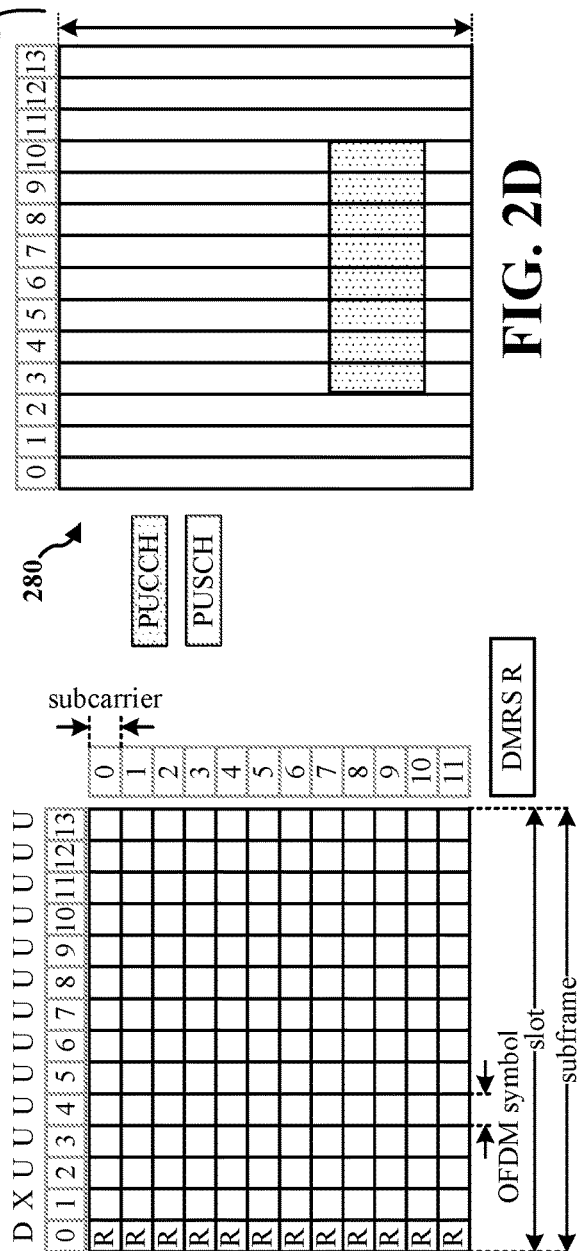
Figure 2A:
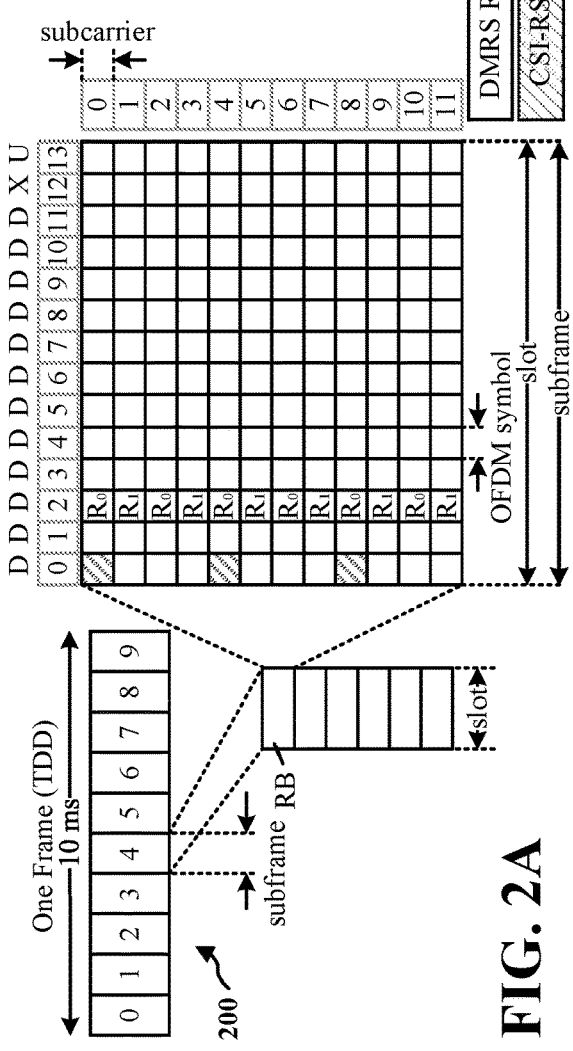
Figure 2C:
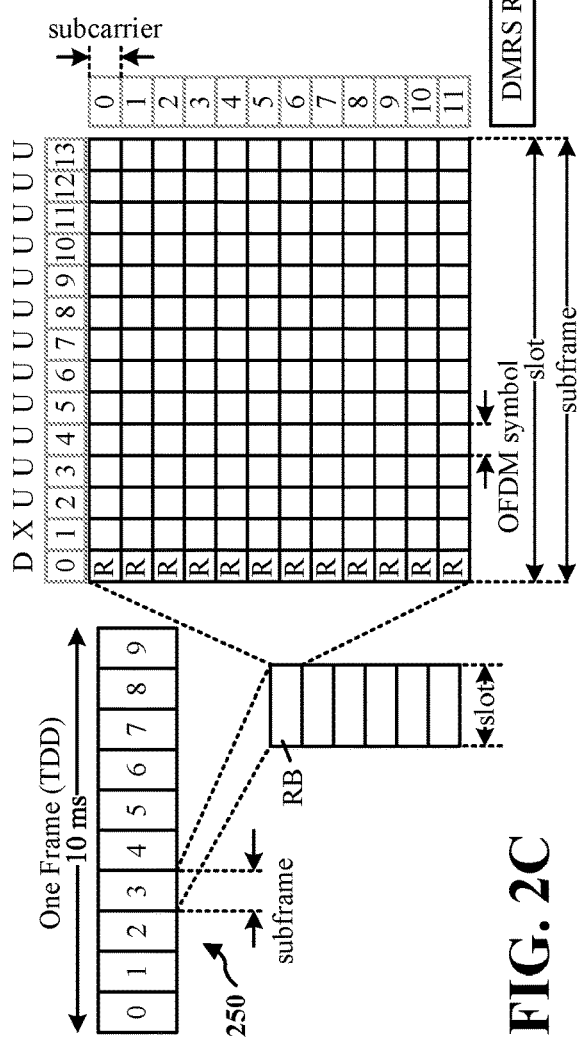

FIG. 2A is a diagram 200 illustrating an example of a first subframe within a 5G/NR frame structure, including an expanded view of a subframe. FIG. 2B is a diagram 230 illustrating an example of DL channels within a 5G/NR subframe. FIG. 2C is a diagram 250 illustrating an example of a second subframe within a 5G/NR frame structure, including an expanded view of a subframe. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE may determine a physical cell identifier (PCI). Based on the PCI, the UE may determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat/request (HARD) acknowledgement (ACK)/negative-ACK (NACK) feedback. The PUSCH carries data, and may additionally be used to carry a buffer status report (BSR), a power headroom report (PHR), or UCI.

Figure 3:
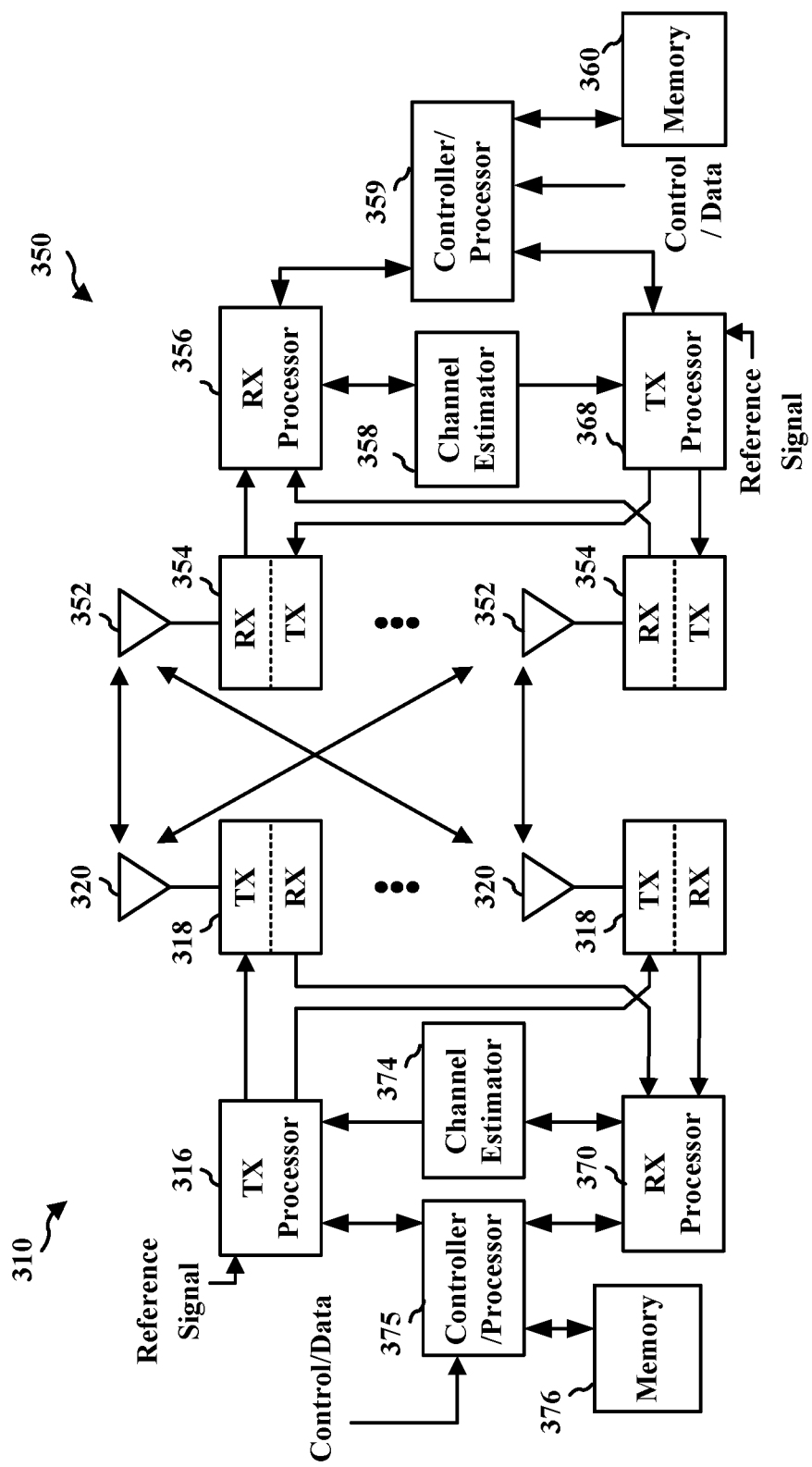
FIG. 3 is a diagram illustrating an example of a base station and an example of a user equipment (UE).

FIG. 3 is a block diagram of an example of a base station 310 in communication with an example of a UE 350. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat/request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 may be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 may be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with communicating component 198 of FIG. 1.

At least one of the TX processor 316, the RX processor 370, and the controller/processor 375 may be configured to perform aspects in connection with configuring component 199 of FIG. 1.

In some wireless communication technologies, such as 5G NR, a UE may be configured to receive, measure, and report downlink beams from a base station, which may be performed as part of beam training or beam refinement operation, as described. In 5G NR, for example, a UE may be configured with multiple beams that may be used, where the configuration may correspond to a TCI state configuration received from a base station that specifies spatial information for the multiple beams. In addition, in some examples, the base station may indicate in a scheduling grant which of enabled or configured TCI states to use in communicating with the base station. As described in examples herein, the base station may or may not indicate an antenna panel to be used with a given beam (for example, with a TCI state).

Figure 4:
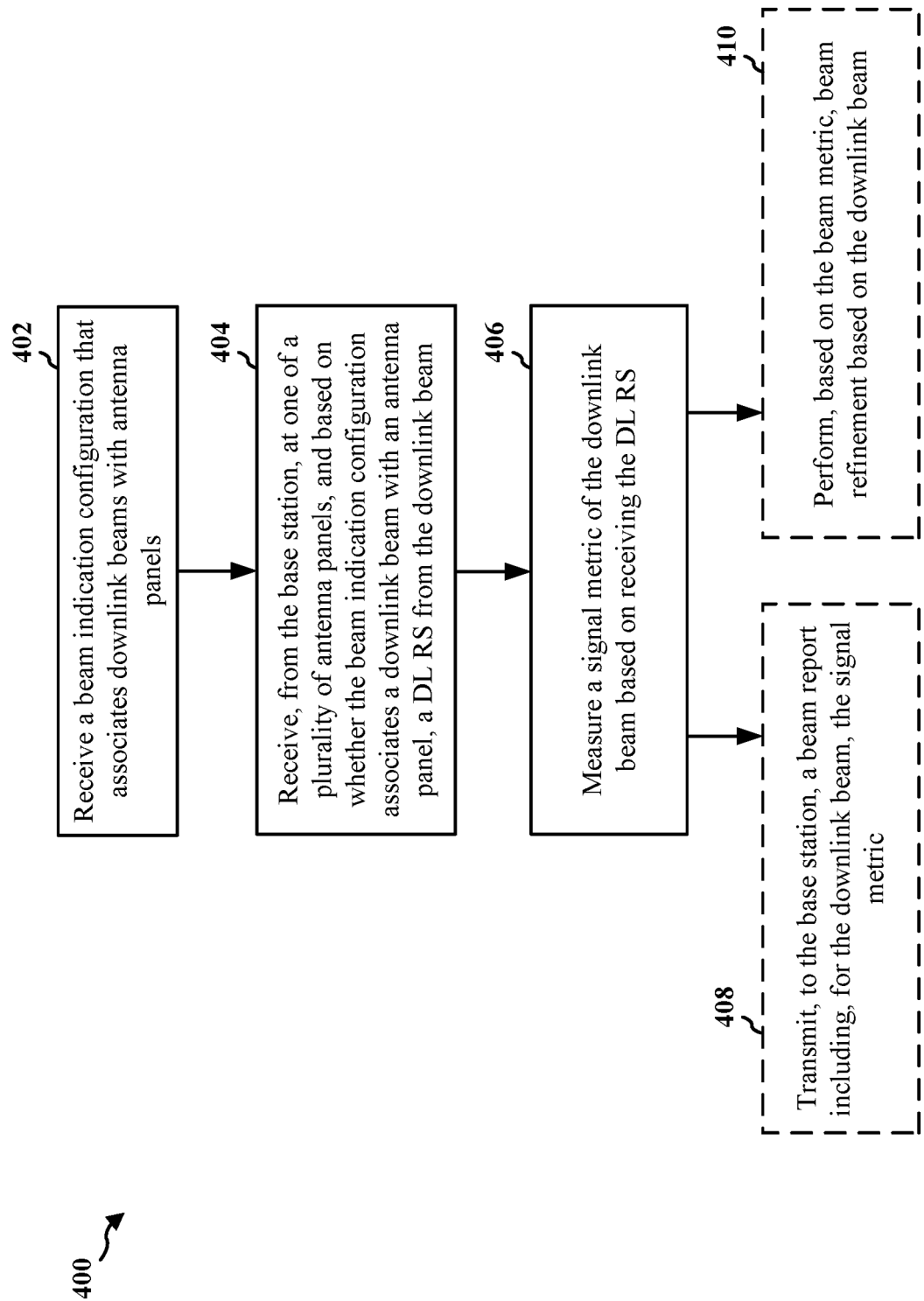
FIG. 4 is a flowchart illustrating an example of a method for determining which of multiple antenna panels to use for a configured beam in accordance with some aspects of the present disclosure.

FIG. 4 is a flowchart illustrating an example of a method 400 for determining which of multiple antenna panels to use for a configured beam in accordance with some aspects of the present disclosure. The method 400 may be performed by a UE (such as the UE 104, the wireless communication device 800, or the wireless communication device 900). In some examples, the method 400 may be performed by a portion of a UE 104, wireless communication device 800, or wireless communication device 900, such as including the memory 360, the memory 808, the TX processor 368, the RX processor 356, the controller/processor 359, the processor 806, or other components described herein.

In block 402, the UE may receive a beam indication configuration that associates downlink beams with antenna panels. In some implementations, panel determining component 912, for example, in conjunction with the communicating component 198 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 908, the transmission component 910, or other components described herein) may receive (for example, from memory 808, from a base station 102 or other node, or the like) a beam indication configuration that associates downlink beams with antenna panels. In an example, the beam indication configuration may be used in determining one of the plurality of antenna panels to use in measuring the downlink beam, as described further herein. In some examples, the UE 104 may include multiple antenna panels, as described, which may each be a physical antenna panel or other array of antennas positioned around the UE 104, virtual antenna panels that include one or more, or a portion of one or more, physical antenna panels, or the like In addition, each antenna panel may have an associated antenna panel identifier. In some examples, the antenna panel identifier may include a SRS resource set identifier, an identifier associated to a reference signal resource or resource set, an identifier assigned for a target reference signal resource or resource set, an identifier additionally configured in spatial relation information, or the like In any case, the antenna panel identifier may identify the antenna panel within the UE 104.

In some examples, communicating component 198 may receive, from the base station 102, the beam indication configuration that may indicate one or more beams for communicating with the base station 102. For example, the beam indication configuration may include a TCI state configuration received from the base station 102 (for example, a TCI state configuration indicating enabled TCI state, which may be received in RRC signaling). In another example, the beam indication configuration may include a TCI state activation received in a scheduling grant for uplink or downlink resources, where the TCI state activation may indicate one of the configured TCI states to be used by the UE 104 in communicating with the base station 102 over the scheduled resources. For example, the TCI state activation may indicate an index of a TCI state in the TCI state configuration. In other examples, the beam indication configuration may include another configuration received from the base station 102 that indicates a beam to use in communicating with the base station 102.

In some examples, the beam indication configuration may also indicate an antenna panel to use to communicate using the configured beam. Thus, for example, the TCI state configuration may indicate antenna panels configured for one or more of the TCI states, the TCI state activation may indicate an antenna panel for the activated TCI state, or the like In other examples, however, the beam indication configuration may not indicate an antenna panel that the UE 104 is to use to communicate using the configured beam. Whether the beam indication configuration indicates the antenna panel may be based on a capability of the base station 102 to indicate the antenna panel, a determination by the base station 102 on whether or not to indicate the antenna panel (for example, whether to incur additional signaling overhead to indicate the antenna panel), or the like In method 400, at block 404, UE 104 may receive, from the base station, at one of a plurality of antenna panels, and based on whether the beam indication configuration associates a downlink beam with an antenna panel, a DL RS from the downlink beam. In an aspect, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station (for example, base station 102), at one of the plurality of antenna panels, and based on whether the beam indication configuration associates the downlink beam with the antenna panel, the DL RS from the downlink beam. For example, communicating component 198 may receive the DL RS over the determined antenna panel(s) and over resources determined for the DL RS (which may be based on a received scheduling grant for the DL RS).

In an example, panel determining component 912 may determine at least one of the multiple antenna panels to use in communicating using the configured beam based on whether the base station 102 indicates an antenna panel to use for the configured beam. For example, at least for DL RS measurement, the determination of panel identifier(s) for the measurement may have the following options. If the panel identifier(s) is configured with the beam indication configuration for a DL RS to be measured by UE, panel determining component 912 may use, or determine to use, the antenna panel(s) corresponding to the configured panel identifier(s) to measure the DL RS, or may determine to use the antenna panel(s) corresponding to any panel identifier(s) to measure the DL RS (in other words, in this option, the UE may ignore the signaled panel identifier(s)). In some examples, however, the signaled panel identifier(s) may not be ignored if the beam indication is not for a DL RS to be measured (for example, where the beam indication is for a panel-specific PDSCH reception). In another example, if the panel identifier is not configured with the beam indication for a DL RS to be measured by UE, panel determining component 912 may use, or determine to use, the antenna panel(s) corresponding to any panel identifier(s) to measure the DL RS, or may use panel identifier(s) associated with the DL RS in a previous report (for example, the latest or last transmitted report) to measure the DL RS.

In addition, for example, the beam indication configuration may include a DL or joint DL and UL TCI state. In some examples, the identifier(s) may be configured as one field in the TCI state information element (IE) in the TCI state configuration received via RRC signaling. In another example, the identifier(s) may be signaled separately with the beam indication, for example in the same DCI or MAC-CE. The DL RS to be measured may be configured with or without report of measured metric. The resource set for the DL RS may be configured with parameter "Repetition" as ON or OFF, as described further herein. In some examples, the base station may dynamically indicate whether to use a specific antenna panel (for example, a configured antenna panel where configured or a previous antenna panel where not configured) or any antenna panel, according to the examples described above, and panel determining component 912 may use, or determine which antenna panel(s) to use, based additionally on this indication. If report is configured, for example, the base station may dynamically change CSI report configuration. In addition, in some examples, panel determining component 912 may select, or determine whether to select, configured antenna panel(s) (for example, where the beam indication configuration indicates antenna panel(s) for a beam) or another (for example, any) antenna panel based on how the panel identifier is configured. For example, if the base station 102 configures the panel identifier in statically configured RRC signaling, panel determining component 912 may select, or determine to select, any antenna panel(s) for the beam (in other words, the UE 104 may ignore the configured antenna panel(s). If the base station 102 configures the panel identifier dynamically (for example, in the scheduling grant triggering the DL RS measurement), panel determining component 912 may select, or determine to select, the configured antenna panel(s) for the beam.

In method 400, at block 406, UE 104 may measure, at the one of the plurality of antenna panels, a signal metric of the downlink beam based on receiving the DL RS. In an aspect, beam measuring component 914, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may measure, at the one of the plurality of antenna panels, the signal metric of the downlink beam based on receiving the DL RS. For example, beam measuring component 914 can perform one or more measurements of the downlink beam based on receiving the DL RS, where the one or more measurements may be of a signal metric, as described herein, or another property of the downlink beam. For example, beam measuring component 914 may measure the signal metric as a received signal strength or quality (for example, reference signal received power (RSRP), reference signal received quality (RSRQ), received signal strength indicator (RSSI), signal-to-noise ratio (SNR), signal-to-interference-and-noise ratio (SINR), or the like) of the DL RS measured at the one of the multiple antenna panels.

In some examples, the measurement may be reported to the base station 102 to facilitate beam refinement or otherwise selecting a beam or corresponding antenna panel to be used in communications between the UE 104 and base station 102. For example, communicating component 198 may receive, from the base station 102, an indication to report the signal metric and may report, or determine to report, the signal metric to the base station based on the indication. In some examples, panel determining component 912 may also determine which antenna panel(s) to use for the downlink beam based on the indication to report the signal metric (for example, panel determining component 912 may determine to use any antenna panel(s) where the indication indicates to report the signal metric).

In method 400, optionally at block 408, UE 104 may transmit, to the base station, a beam report including, for the downlink beam, the signal metric. In an aspect, beam measuring component 914, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may transmit, to the base station, the beam report including, for the downlink beam, the signal metric or the one or more measurements of other signal properties. As described, this may enable the base station 102 to determine or indicate an antenna panel that the UE 104 is to use for one or more beams (for example, an antenna panel having a highest reported signal metric for the beam).

In method 400, optionally at block 410, UE 104 may perform, based on the beam metric, beam refinement based on the downlink beam. In an aspect, beam measuring component 914, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may perform, based on (e.g., using) the beam metric, beam refinement based on the downlink beam. As described, this may enable the UE 104 to select or indicate a desired beam and antenna panel configuration to use in communicating with the base station 102.

Figure 5:
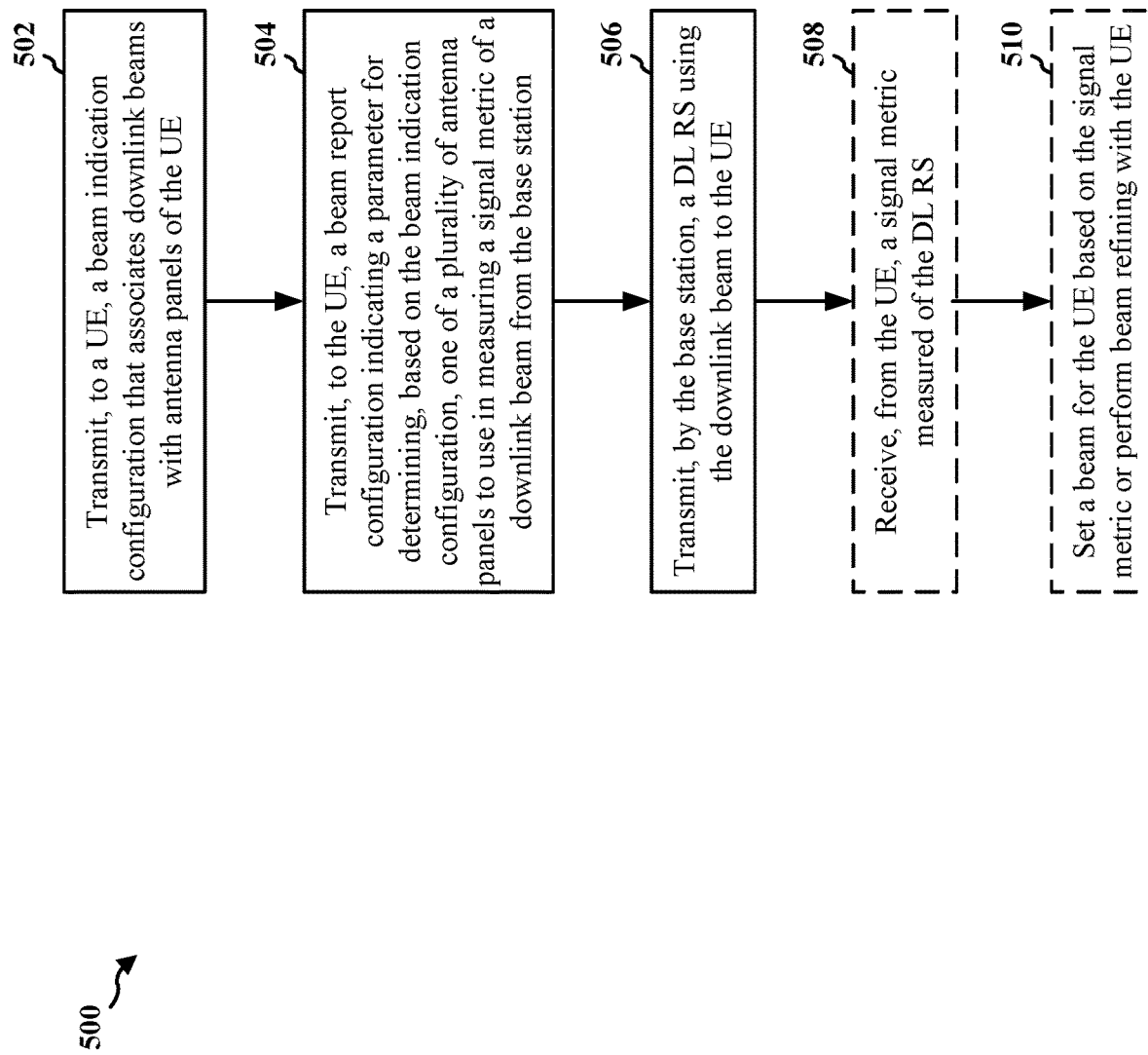
FIG. 5 is a flowchart illustrating an example of a method for transmitting a configuration for determining an antenna panel associated with a downlink beam in accordance with some aspects of the present disclosure.

FIG. 5 is a flowchart illustrating an example of a method 500 for transmitting a configuration for determining an antenna panel associated with a downlink beam in accordance with some aspects of the present disclosure. The method 500 may be performed by a base station (such as the base station 102, the wireless communication device 800, or the wireless communication device 1000). In some examples, the method 500 may be performed by a portion of a base station 102, wireless communication device 800, or wireless communication device 1000, such as including the memory 360, the memory 808, the TX processor 368, the RX processor 356, the controller/processor 359, the processor 806, or other components described herein.

In block 502, the base station may transmit, to a UE, a beam indication configuration associating downlink beams and antenna panels of the UE. In some implementations, beam configuring component 1012, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may transmit, to the UE (for example, UE 104), the beam indication configuration associating downlink beams and antenna panels of the UE. For example, beam configuring component 1012 may also generate and transmit the beam indication configuration, which may include a TCI state configuration for transmitting using RRC signaling, a TCI state activation for transmitting using a scheduling grant (for example, in or based on MAC-CE or DCI), other configurations, or the like, as described above. The beam indication configuration, for example, may include a downlink or joint downlink and uplink TCI state. In addition, in some examples, the beam indication configuration may indicate the antenna panel(s) in a TCI state IE.

In block 504, the base station may transmit, to a UE, a beam report configuration indicating a parameter for determining, based on the beam indication configuration, one of a plurality of antenna panels to use in measuring a signal metric of a downlink beam from the base station. In some implementations, beam configuring component 1012, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may transmit, to the UE (for example, UE 104), the beam report configuration indicating the parameter for determining, based on the beam indication configuration, one of a plurality of antenna panels to use in measuring a signal metric of a downlink beam from the base station. In some examples, the beam report configuration may indicate how the UE 104 is to determine the antenna panel(s) for a beam when a beam indication configuration does or does not indicate the antenna panel(s) for a given downlink beam (or TCI state). For example, as described, the beam report configuration may indicate to, when the beam indication configuration does indicate the antenna panel(s) for a downlink beam, use the indicated antenna panel(s) or use any antenna panel(s) configured at the UE 104. In some examples, this may be based on other considerations, such as whether the beam indication configuration is received via static RRC signaling or more dynamic signaling including MAC-CE/DCI, or the like In another example, as described, the beam report configuration may indicate to, when the beam indication configuration does not indicate the antenna panel(s) for a downlink beam, use a previously used antenna panel(s) (for example, as indicated in a previous beam indication configuration or otherwise determined to be used for a last beam) or use any antenna panel(s) configured at the UE 104. In some examples, this may be based on other considerations, such as whether the beam indication configuration is received via static RRC signaling or more dynamic signaling including MAC-CE/DCI, or the like In addition, as described, the beam indication configuration may or may not also indicate the antenna panel(s) to be used for each beam, and a UE 104 receiving the beam report configuration may determine which antenna panel(s) to use for a given beam based on whether the beam report configuration indicates the antenna panel or not, based on a type of the configuration or signaling over which the beam report configuration is received (for example, RRC or MAC/CE/DCI), or the like In addition, in some examples, the beam report configuration may or may not also include an indication to report signal metrics for downlink beams. In some examples, the beam report configuration may include or be part of a scheduling grant for a DL RS and may indicate a TCI state for the DL RS, an antenna panel to use for the TCI state, whether reporting is configured for the DL RS, whether repetition is configured for the DL RS, or the like, as described.

In block 506, the base station may transmit a DL RS using the downlink beam to the UE. In some implementations, beam generating component 1014, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may generate and transmit the DL RS using the downlink beam to the UE (for example, UE 104). In some examples, beam generating component 1014 may transmit the DL RS over resources indicated in a scheduling grant or configuration for the DL RS, using repetition as specified in the scheduling grant or configuration, or the like, and the UE 104 may receive and measure the DL RS, as described herein. In some examples, where the configuration enables reporting, configuring component 199 may also receive a report of a signal metric measured of the DL RS using the determined antenna panel(s), as described above. Configuring component 199 may use this information to perform beam refinement or otherwise determine a beam or other parameters for communications between the UE 104 and base station 102, as described.

Optionally, in block 508, the base station may receive, from the UE a signal metric measured of the DL RS. In some implementations, beam generating component 1014, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may receive, from the UE (for example, UE 104), the signal metric measured of the DL RS. For example, beam generating component 1014 may receive the signal metric in a beam report, and may determine that the signal metric is associated with a certain beam. The signal metric may include RSRP, RSRQ, RSSI, SNR, or the like, as described.

Optionally, in block 510, the base station may set a beam for the UE based on the signal metric or perform beam refining with the UE. In some implementations, beam generating component 1014, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may set the beam for the UE based on the signal metric or perform beam refining with the UE. In some examples, such as where the signal metric achieves a threshold, beam generating component 1014 may set the beam for subsequent communications with the UE. In other examples, such as where the signal metric does not achieve the threshold or is below another threshold, beam generating component 1014 may perform beam refining with the UE to select a new beam for communicating with the UE.

Figure 6:
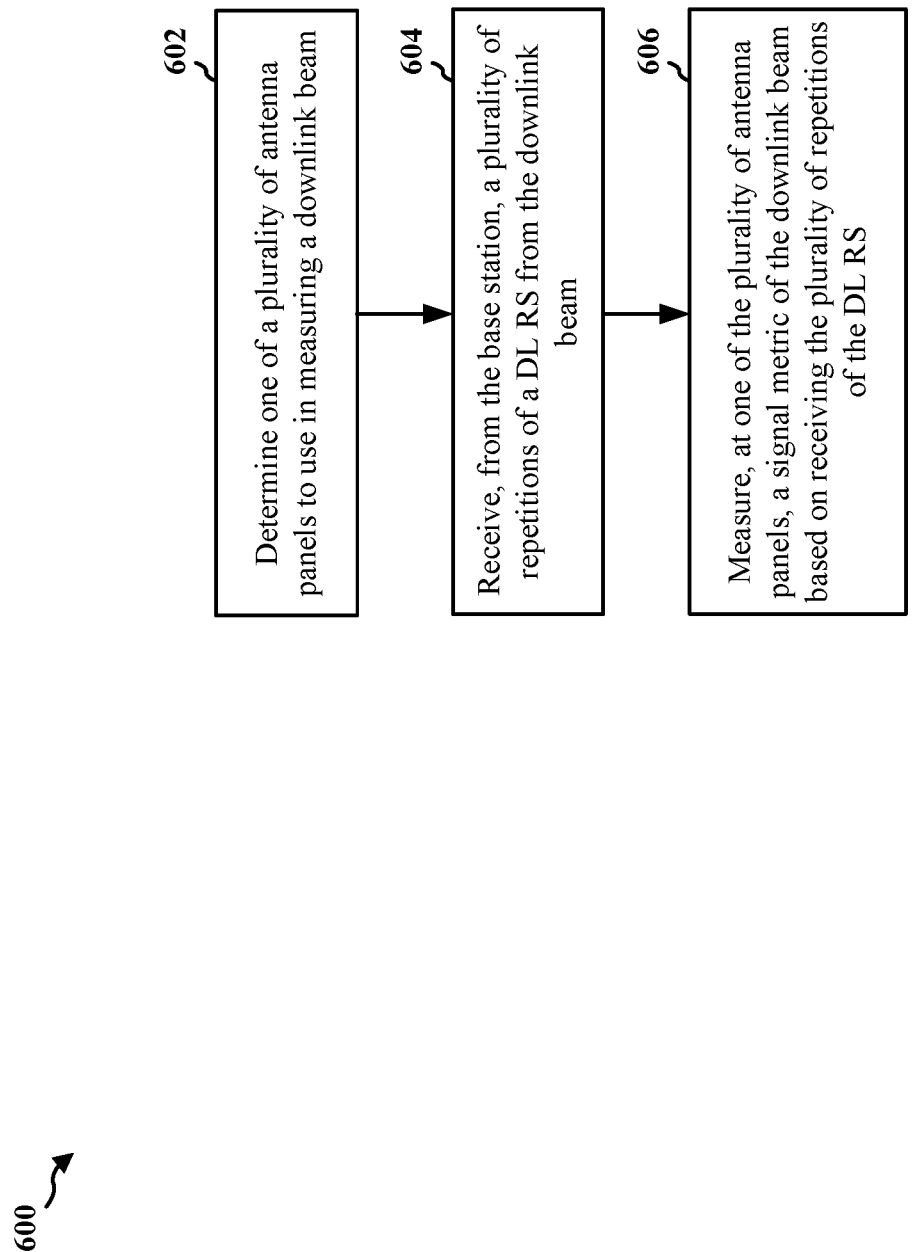
FIG. 6 is a flowchart illustrating an example of a method for determining antenna panels for performing beam refinement in accordance with some aspects of the present disclosure.

FIG. 6 is a flowchart illustrating an example of a method 600 for determining antenna panels for performing beam refinement in accordance with some aspects of the present disclosure. The method 600 may be performed by a UE (such as the UE 104, the wireless communication device 800, the wireless communication device 900). In some examples, the method 600 may be performed by a portion of a UE 104, wireless communication device 800, or wireless communication device 900, such as by the memory 360, memory 808, the TX processor 368, the RX processor 356, or the controller/processor 359, processor 806, or other components.

In method 600, at block 602, the UE may determine one of a plurality of antenna panels to use in measuring a downlink beam. In some aspects, panel determining component 912, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may determine one of the plurality of antenna panels to use in measuring a downlink beam. For example, panel determining component 912 may determine the one (or more) of the multiple antenna panels to use in measuring a downlink beam as part of a beam refinement procedure. For example, communicating component 198 may receive, from the base station 102, a scheduling grant for a downlink reference signal to be transmitted using the downlink beam. The scheduling grant, in some examples, may indicate resources for receiving an aperiodic (AP) CSI-RS from the base station 102. In some examples, panel determining component 912 may determine the one of the multiple antenna panels to use in measuring the downlink beam or one or more repetitions thereof based on the scheduling grant or the reference signal. In some examples, the scheduling grant or other indication may indicate a number of repetitions (for example, a count of the number of repetitions) of the DL RS that are to be transmitted, a number (for example, a count) of candidate beams for which a number of repetitions of the DL RS are to be transmitted, a number (for example, a count) of antenna panels for which the candidate beams are to be transmitted, or the like In some examples, panel determining component 912 may determine a scheduling offset between when the scheduling grant is received and when the reference signal is received. If the scheduling offset is within a threshold, for example, panel determining component 912 may determine to measure the reference signal and repetitions thereof using the antenna panel(s) that are active when the scheduling grant is received. If the scheduling offset exceeds the threshold, for example, panel determining component 912 may determine to measure the reference signal and repetitions thereof using additional (for example, all) antenna panels at the UE 104. In some examples, the threshold for the scheduling offset may be determined as a number of symbols (for example, 224 or 336 symbols). In addition, the number of repetitions of the DL RS (and/or the corresponding repetition resources) may be determined based on the scheduling offset to include sufficient repetitions for the active antenna panel(s) or the additional antenna panel(s) (for example, for a full beam sweep). In some examples, panel determining component 912 may transmit, to the base station 102, an indication of the number of repetitions to transmit, an indication of the number of candidate beams, an indication of the number of antenna panels for which to transmit the candidate beams (for example, the number of active e antenna panels or additional antenna panels), or the like For example, for the measurement of a set of AP CSI-RS resources transmitted by the same DL spatial filter (for example, where the resource set has parameter "repetition" configured as ON for DL Rx beam refinement via Rx beam sweep (P3) as defined in 5G NR), two scheduling offset thresholds may be defined. If the scheduling offset is greater than or equal to the smaller threshold (for example, 28 symbols) but less than the larger threshold (for example, 224 or 336 symbols), the number of repeated AP CSI-RS resources transmitted by the same spatial filter may be no less than a maximum of the candidate beam number per active panel when the DCI for the AP CSI-RS is received. In this regard, for example, the active antenna panel(s) may have sufficient repetitions for the beam sweep to determine a Rx beam for each active panel. The active panel may be any active panel or a subset of active panel(s) indicated by base station. If the scheduling offset is greater than or equal to the larger threshold, the number of repeated AP CSI-RS resources transmitted by the same spatial filter may be no less than a maximum of the candidate beam number per panel, which includes both active and idle panels when the scheduling grant for the AP CSI-RS is received. In this regard, for example, each panel may have sufficient repetitions for the full beam sweep to determine an Rx beam per panel. Each panel may include any panel or a subset of panel(s) indicated by base station.

In method 600, at block 604, the UE may receive, from the base station, a plurality of repetitions of a DL RS from the downlink beam. In some aspects, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station (for example, base station 102), the plurality of repetitions of the DL RS from the downlink beam. For example, communicating component 198 may receive the multiple repetitions over indicated repetition resources and for each of the candidate beams for each of determined antenna panels of the multiple antenna panels, as described above, to perform beam refinement.

In method 600, at block 606, the UE may measure, at one of the plurality of antenna panels, a signal metric of the downlink beam based on receiving the plurality of repetitions of the DL RS. In some aspects, beam measuring component 914, for example, in conjunction with one or more of communicating component 198, the TX processor 368, the RX processor 356, or the controller/processor 359, the memory 360, the receiver or transmitter 354, modem 802, radio 804, processor 806, memory 808, reception component 908, transmission component 910, or other components, may measure, at one of the plurality of antenna panels, the signal metric of the downlink beam based on receiving the plurality of repetitions of the DL RS. For example, beam measuring component 914 may measure, at each of the one (or more) of the multiple antenna panel(s), each of multiple candidate beams for determining a candidate beam to use with the given antenna panel. In another example, beam measuring component 914 may report the signal metrics to the base station 102 so the base station may determine which candidate beam to use with the given antenna panel at the UE 104.

Figure 7:
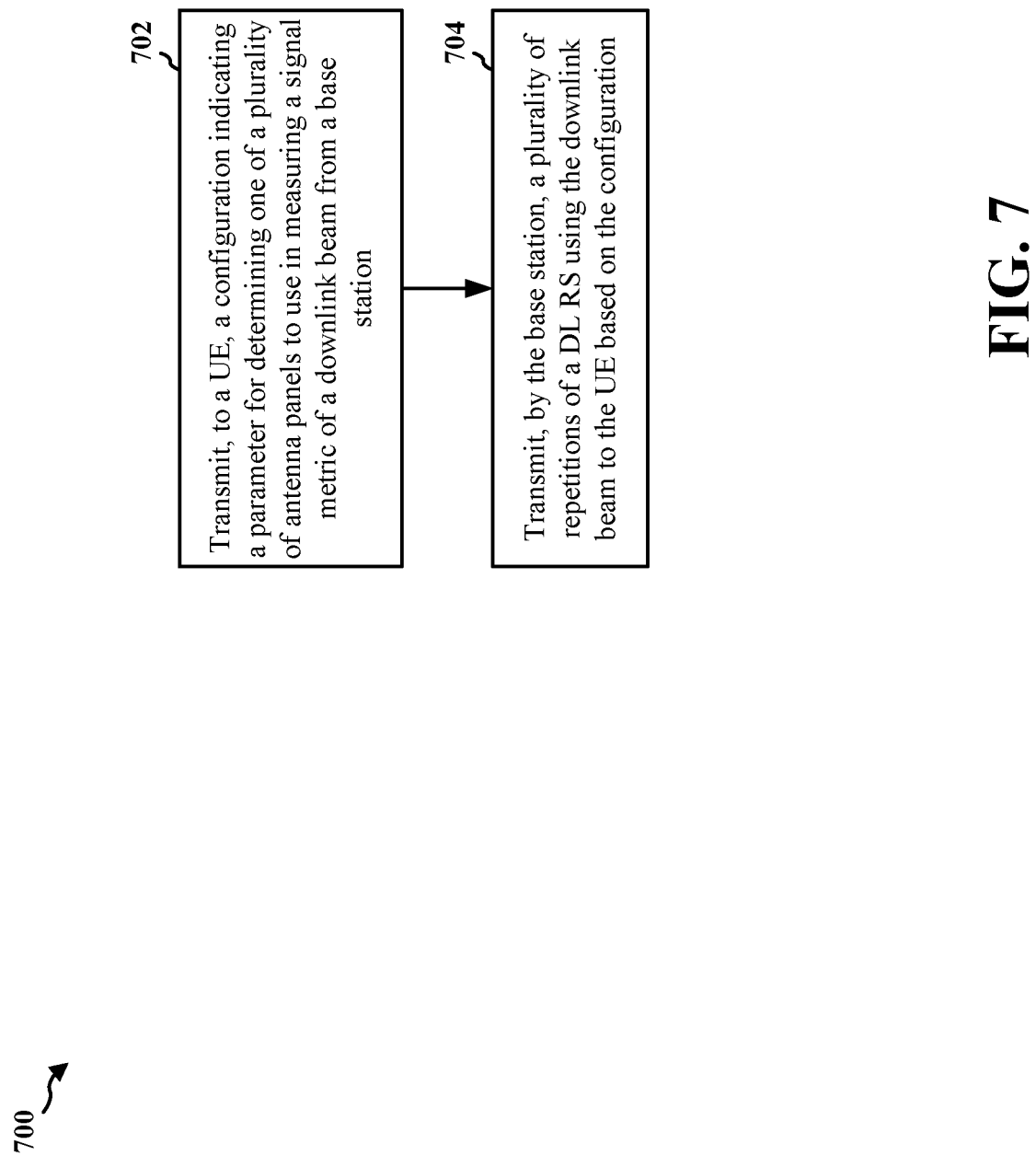
FIG. 7 is a flowchart illustrating an example of a method for determining a number of repetitions of a beam for performing beam refinement in accordance with some aspects of the present disclosure.

FIG. 7 is a flowchart illustrating an example of a method 700 for determining a number of repetitions of a beam for performing beam refinement in accordance with some aspects of the present disclosure. The method 700 may be performed by a base station (such as the base station 102, the wireless communication device 800, or the wireless communication device 1000). In some examples, the method 700 may be performed by a portion of a base station 102, wireless communication device 800, or wireless communication device 1000, such as including the memory 360, the memory 808, the TX processor 368, the RX processor 356, the controller/processor 359, the processor 806, or other components described herein.

In block 702, the base station may transmit, to a UE, a configuration indicating a parameter for determining one of a plurality of antenna panels to use in measuring a signal metric of a downlink beam from a base station. In some implementations, beam configuring component 1012, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may transmit, to the UE (for example, UE 104), a configuration indicating a parameter for determining one of the plurality of antenna panels to use in measuring a signal metric of a downlink beam from the base station. For example, beam configuring component 1012 may transmit the configuration as, or as part of, a scheduling grant for a DL RS to be transmitted using the downlink beam. The scheduling grant or other configuration may include one or more of a parameter indicating that repetitions of the downlink beam are to be transmitted for performing beam refinement, a number (for example, a count) of candidate beams that are to be transmitted, a number (for example, a count) of antenna panels for which the candidate beams are to be transmitted, or the like For example, beam configuring component 1012 may determine the number of repetitions based on the scheduling offset between resources over which the scheduling grant for the DL RS is scheduled for transmission and resources over which the DL RS is scheduled for transmission, as described above. In some examples, beam configuring component 1012 may determine a number of antenna panels for which to transmit candidate beams of the downlink beam based on the scheduling offset (for example, a number of antenna panels that are active when the scheduling grant is transmitted, all antenna panels, or the like, as described). In another example, beam configuring component 1012 may receive, from the UE 104, an indication of a number of antenna panels for which to transmit the candidate beams.

In method 700, at block 704, the base station may transmit a plurality of repetitions of a DL RS using the downlink beam to the UE based on the configuration. In some implementations, beam generating component 1012, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may generate and transmit a plurality of repetitions of the DL RS using the downlink beam to the UE based on the configuration. In some examples, the configuration may indicate resources over which the base station 102 transmits the repetitions of the downlink beam using the candidate beams. The configuration may be a scheduling grant for the DL RS, as described, which may indicate the resources over which the repetitions are transmitted. The UE 104, as described, may receive the scheduling grant and accordingly receive the repetitions of the DL RS using the indicated number of antenna panels for measuring the DL RS repetitions to determine which of candidate beams to use in communicating with the base station 102.

Figure 8:
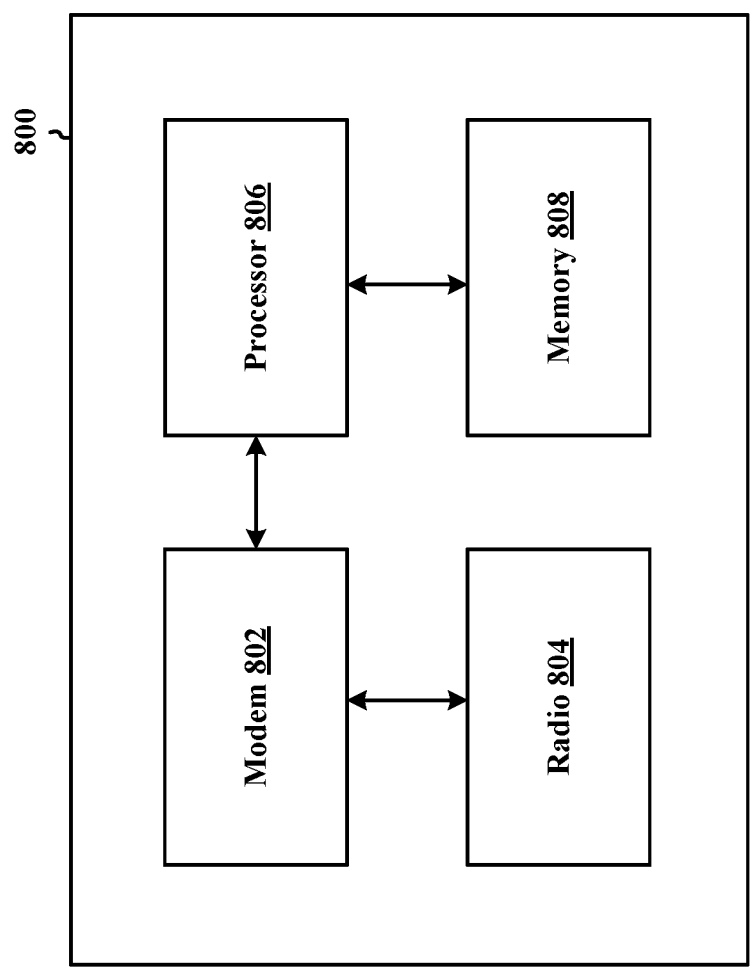
FIG. 8 shows a block diagram of an example of a wireless communication device that supports determining one or more antenna panels to use for a configured beam or to perform beam refinement in accordance with some aspects of the present disclosure.

FIG. 8 shows a block diagram of an example of a wireless communication device 800 that supports determining one or more antenna panels to use for a configured beam or to perform beam refinement in accordance with some aspects of the present disclosure. In some implementations, the wireless communication device 800 may be an example of a device for use in a UE such as one of the UEs 104 described with reference to FIG. 1. In some implementations, the wireless communication device 800 may be an example of a device for use in an base station such as the base station 102 described with reference to FIG. 1. The wireless communication device 800 is capable of transmitting (or outputting for transmission) and receiving wireless communications (for example, in the form of wireless packets). For example, the wireless communication device may be configured to transmit and receive packets in the form of packet data convergence protocol (PDCP) protocol data units (PDUs) and medium access control (MAC) PDUs, etc.

The wireless communication device 800 may be, or may include, a chip, system on chip (SoC), chipset, package or device that includes one or more modems 802, (collectively "the modem 802"), which may include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 may include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The de-multiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 may include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 may include an intelligent hardware block or device such as, for example, a processing core, a processing block, a central processing unit (CPU), a microprocessor, a micro-controller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of PDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 may include tangible storage media such as random-access memory (RAM) or read-only memory (ROM), or combinations thereof. The memory 808 also may store non-transitory processor- or computer-executable software (SW) code containing instructions that, when executed by the processor 806, cause the processor to perform various operations described herein for wireless communication, including the generation, transmission, reception and interpretation of PDUs, frames or packets. For example, various functions of components disclosed herein, or various blocks or steps of a method, operation, process or algorithm disclosed herein, may be implemented as one or more modules of one or more computer programs.

Figure 9:
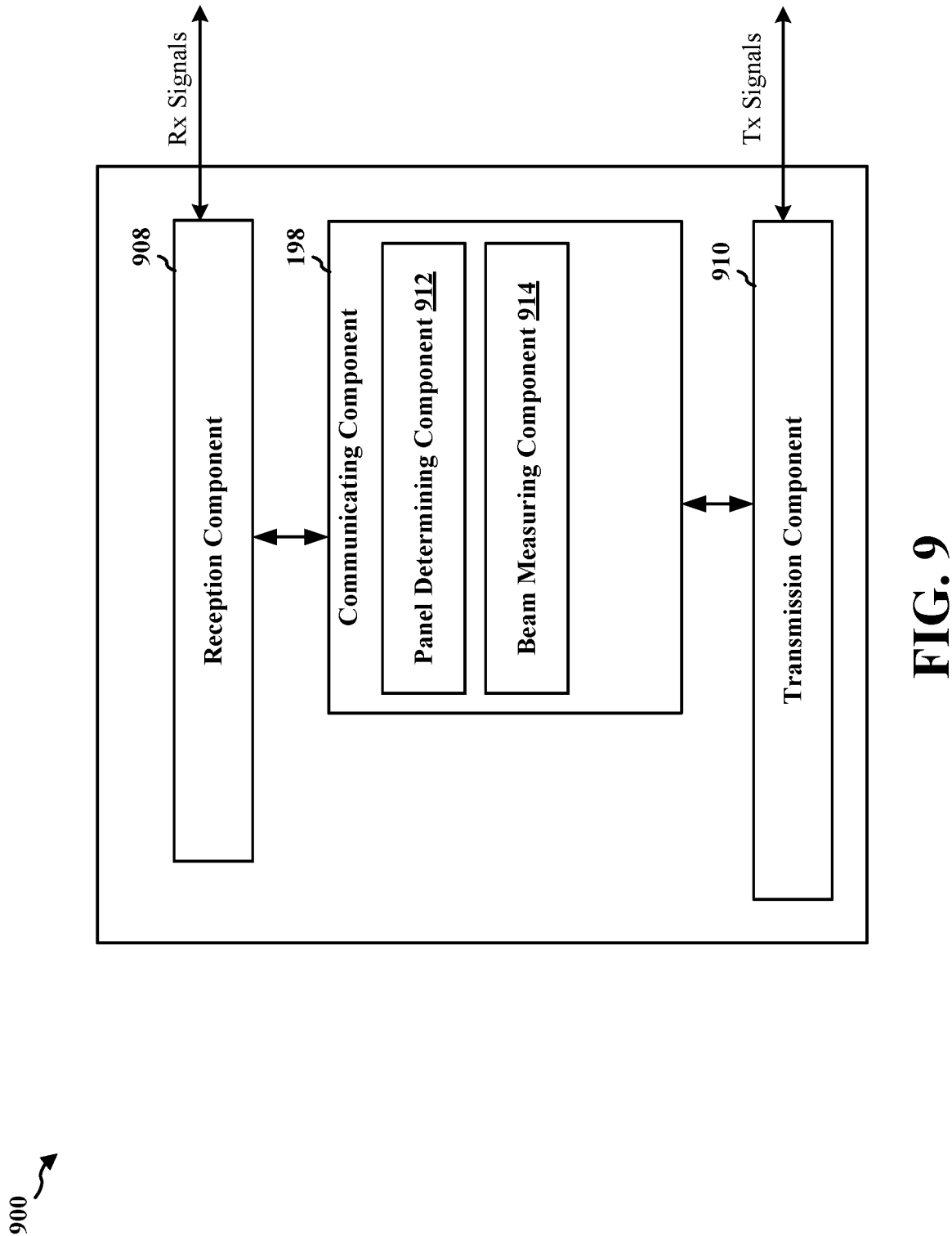
FIG. 9 shows a block diagram of an example of a wireless communication device according to some implementations that supports determining one or more antenna panels to use for a configured beam or to perform beam refinement in accordance with some aspects of the present disclosure.

FIG. 9 shows a block diagram of an example of a wireless communication device 900 that supports determining one or more antenna panels to use for a configured beam or to perform beam refinement in accordance with some aspects of the present disclosure. In some implementations, the wireless communication device 900 is configured to perform any of the processes 400 or 600 described above with reference to FIGS. 4 and 6, respectively. In some implementations, the wireless communication device 900 may be an example of an implementation of the wireless communication device 800 described above with reference to FIG. 8. For example, the wireless communication device 900 may be a chip, SoC, chipset, package or device that includes at least one processor and at least one modem (for example, a Wi-Fi (IEEE 802.11) modem or a cellular modem).

The wireless communication device 900 includes a reception component 908, a communicating component 198, and a transmission component 910. The communicating component 198 may further include a panel determining component 912, and a beam measuring component 914. Portions of one or more of the components 912 and 914, may be implemented at least in part in hardware or firmware. In some implementations, at least one of the components 912 and 914, is implemented at least in part as software stored in a memory (such as the memory 808). For example, portions of one or more of the components 912 and 914, may be implemented as non-transitory instructions or code executable by a processor (such as the processor 806) to perform the functions or operations of the respective component.

The reception component 908 is configured to receive RX signals from another wireless communication device. The communicating component 198 is configured to receive and measure downlink beams by one or more antenna panels via transmission component 910, as described herein. Moreover, as described, panel determining component 912 may determine which antenna panels to use to receive the downlink beams, beam measuring component 914 may measure the beams using the one or more antenna panels (for example, for beam refinement or other procedures).

Figure 10:
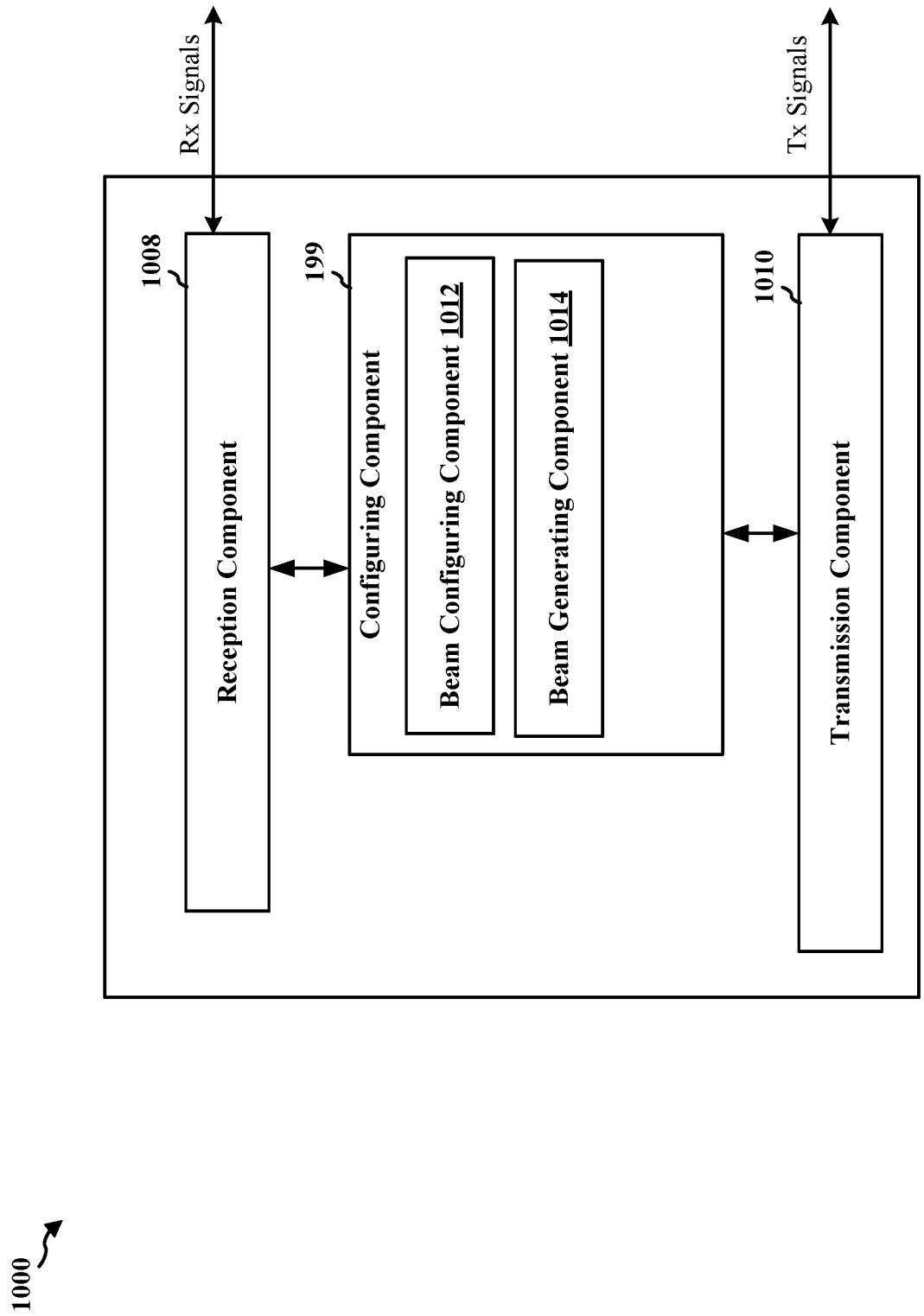
FIG. 10 shows a block diagram of an example of a wireless communication device according to some implementations that supports determining one or more antenna panels to use for a configured beam or to perform beam refinement in accordance with some aspects of the present disclosure.

FIG. 10 shows a block diagram of an example of a wireless communication device 1000 that supports determining one or more antenna panels to use for a configured beam or to perform beam refinement in accordance with some aspects of the present disclosure. In some implementations, the wireless communication device 1000 is configured to perform processes 500 and 700 described above with reference to FIGS. 5 and 7. In some implementations, the wireless communication device 1000 may be an example of an implementation of the wireless communication device 800 described above with reference to FIG. 8. For example, the wireless communication device 1000 may be a chip, SoC, chipset, package or device that includes at least one processor and at least one modem (for example, a Wi-Fi (IEEE 802.11) modem or a cellular modem).

The wireless communication device 1000 includes a reception component 1008, a configuring component 199, and a transmission component 1010. The configuring component 199 may further include a beam configuring component 1012, and a beam generating component 1014. Portions of one or more of the components 1012 or 1014 may be implemented at least in part in hardware or firmware. In some implementations, at least one of the components 1012 or 1014 is implemented at least in part as software stored in a memory (such as the memory 808). For example, portions of one or more of the components 1012 or 1014 may be implemented as non-transitory instructions or code executable by a processor (such as the processor 806) to perform the functions or operations of the respective component.

The reception component 1008 is configured to receive RX signals from another wireless communication device. In some implementations, the RX signals may include uplink signals received from a UE 104. The configuring component 199 is configured to transmit one or more beams or repetition thereof, which may be configured by beam configuring component 1012 and generated by a beam generating component 1014 that may generate and transmit multiple downlink beams.

The following aspects are illustrative only and aspects thereof may be combined with aspects of other embodiments or teaching described herein, without limitation.

Aspect 1 is a method for wireless communication including determining, based on whether a beam indication configuration received from a base station associates a downlink beam with an antenna panel, one of a plurality of antenna panels to use in measuring the downlink beam, receiving, from the base station, a DL RS from the downlink beam, and measuring, at the one of the plurality of antenna panels, a signal metric of the downlink beam based on receiving the DL RS.

In Aspect 2, the method of Aspect 1 includes where determining the one of the plurality of antenna panels to use in measuring the downlink beam includes determining, where the beam indication configuration associates the downlink beam with the antenna panel, to use the antenna panel as indicated in the beam indication configuration.

In Aspect 3, the method of Aspect 2 includes where determining to use the antenna panel is based on a configuration received in at least one of RRC signaling, a DCI, or MAC-CE.

In Aspect 4, the method of Aspect 3 includes where determining to use the antenna panel is based on determining that the configuration is the beam indication configuration received in a DCI or MAC-CE related to the downlink beam.

In Aspect 5, the method of any of Aspects 1 to 4 includes where determining the one of the plurality of antenna panels to use in measuring the downlink beam includes determining, where the beam indication configuration associates the downlink beam with the antenna panel, to use any one of the plurality of antenna panels regardless of the antenna panel indicated in the beam indication configuration.

In Aspect 6, the method of Aspect 5 includes where determining to use any one of the plurality of antenna panels is based on a configuration received in at least one of RRC signaling, a DCI, or MAC-CE.

In Aspect 7, the method of Aspect 6 includes where determining to use any one of the plurality of antenna panels is based on determining that the configuration is the beam indication configuration including a TCI state IE received in RRC signaling.

In Aspect 8, the method of any of Aspects 5 to 7 includes where determining to use any of the plurality of antenna panels is based at least in part on the configuration as a DL RS configuration of the DL RS.

In Aspect 9, the method of any of Aspects 1 to 8 includes where determining the one of the plurality of antenna panels to use in measuring the downlink beam includes determining, where the beam indication configuration does not associate the downlink beam with the antenna panel, to use any one of the plurality of antenna panels.

In Aspect 10, the method of Aspect 9 includes where determining to use any one of the plurality of antenna panels is based on a configuration received in at least one of RRC signaling, a DCI, or MAC-CE.

In Aspect 11, the method of any of Aspects 1 to 10 includes where determining the one of the plurality of antenna panels to use in measuring the downlink beam includes determining, where the beam indication configuration does not associate the downlink beam with the antenna panel, to use a previous antenna panel associated with a previous beam report transmitted to the base station.

In Aspect 12, the method of Aspect 11 includes where determining to use the previous antenna panel is based on a configuration received in at least one of RRC signaling, a DCI, or MAC-CE.

In Aspect 13, the method of any of Aspects 1 to 12 includes where the beam indication configuration indicates downlink or joint downlink and uplink TCI states, each having an associated antenna panel.

In Aspect 14, the method of Aspect 13 includes where the beam indication configuration includes a TCI state IE received in RRC signaling or a beam indication received in a DCI or MAC-CE related to the downlink beam.

In Aspect 15, the method of any of Aspects 1 to 14 includes receiving, from the base station, a configuration to report the signal metric for the downlink beam.

In Aspect 16, the method of Aspect 16 includes where determining the one of the plurality of antenna panels to use in measuring the downlink beam includes determining, based on the configuration, to use any one of the plurality of antenna panels.

In Aspect 17, the method of any of Aspects 16 or 17 includes transmitting, to the base station and based on the indication, a beam report including, for the downlink beam, the signal metric measured of the downlink beam.

In Aspect 18, the method of any of Aspects 1 to 17 includes where each of the plurality of antenna panels include a virtual antenna panel that corresponds to one or more, or a portion of one or more, physical antenna arrays.

Aspect 19 is a method for wireless communication including determining one of a plurality of antenna panels to use in measuring a downlink beam, receiving, from the base station, a plurality of repetitions of a DL RS from the downlink beam, and measuring, at the one of the plurality of antenna panels, a signal metric of the downlink beam based on receiving the plurality of repetitions of the DL RS.

In Aspect 20, the method of claim 19 includes where the DL RS is an aperiodic CSI-RS scheduled by DCI.

In Aspect 21, the method of any of Aspects 19 or 20 includes determining a count of the plurality of repetitions based on a configuration for the DL RS.

In Aspect 22, the method of Aspect 21 includes where determining the count of the plurality of repetitions includes determining the count indicated by the base station.

In Aspect 23, the method of Aspect 22 includes where the count corresponds to a maximum number of candidate beams of the plurality of antenna panels when a scheduling offset is larger than a threshold or a maximum number of candidate beams of active antenna panels of the plurality of antenna panels receiving a grant for the reference signal when the scheduling offset is not larger than the threshold.

In Aspect 24, the method of Aspect 23 includes transmitting, to the base station, at least one of an indication of the maximum number of candidate beams for each of the plurality of antenna panels or an indication of the active antenna panels.

Aspect 25 is a method for wireless communication including transmitting, to a UE, a configuration indicating a parameter for determining one of a plurality of antenna panels to use in measuring a signal metric of a downlink beam from the base station based on whether a beam indication configuration transmitted by the base station indicates an association between the downlink beam and an antenna panel of the UE, and transmitting, by the base station, a DL RS using the downlink beam to the UE.

In Aspect 26, the method of Aspect 25 includes transmitting the beam indication configuration in at least one of RRC signaling, a DCI, or MAC-CE.

In Aspect 27, the method of any of Aspects 25 or 26 includes where transmitting the configuration includes transmitting the configuration in at least one of RRC signaling, a DCI, or MAC-CE.

In Aspect 28, the method of any of Aspects 25 to 27 includes where the configuration specifies, where the beam indication configuration indicates the association, whether to use the antenna panel in measuring the downlink beam or whether to use any of the plurality of antenna panels in measuring the downlink beam.

In Aspect 29, the method of any of Aspects 25 to 28 includes where the configuration specifies, where the beam indication configuration does indicate the association, whether to use a previous antenna panel configured for measuring a previous downlink beam in measuring the downlink beam or whether to use any of the plurality of antenna panels in measuring the downlink beam.

In Aspect 30, the method of any of Aspects 25 to 29 includes where the beam indication configuration indicates downlink or joint downlink and uplink TCI states, each having an associated antenna panel.

In Aspect 31, the method of any of Aspects 25 to 30 includes transmitting, to the UE, a configuration to report the signal metric for the downlink beam.

In Aspect 32, the method of Aspect 31 includes receiving, from the UE and based on the indication, a beam report including, for the downlink beam, the signal metric measured of the downlink beam.

In Aspect 33, the method of any of Aspects 25 to 32 includes where each of the plurality of antenna panels include a virtual antenna panel that corresponds to one or more, or a portion of one or more, physical antenna arrays.

Aspect 34 is a method for wireless communication including transmitting, to a UE, a configuration indicating a parameter for determining one of a plurality of antenna panels to use in measuring a signal metric of a downlink beam from a base station, and transmitting, by the base station, a plurality of repetitions of a DL RS using the downlink beam to the UE based on the configuration.

In Aspect 35, the method of Aspect 34 includes where the DL RS is an aperiodic CSI-RS scheduled by DCI.

In Aspect 36, the method of any of Aspects 34 or 35 includes determining a count of the plurality of repetitions based on the beam indication configuration, and transmitting, to the UE, an indication of the count.

In Aspect 37, the method of Aspect 36 includes where determining the count of the plurality of repetitions includes determining the count as a maximum number of candidate beams for the one of the plurality of antenna panels that is active when the beam indication configuration is transmitted in a grant scheduling the DL RS.

In Aspect 38, the method of Aspect 37 includes receiving, from the UE, an indication of the one of the plurality of antenna panels that is active.

In Aspect 39, the method of any of Aspects 37 or 38 includes where determining the count as the maximum number of candidate beams is based on determining a scheduling offset, between transmitting the grant and transmitting the DL RS, does not exceed a threshold.

In Aspect 40, the method of any of Aspects 36 to 39 includes where determining the count of the plurality of repetitions includes determining the count as a maximum number of candidate beams for the plurality of antenna panels.

In Aspect 41, the method of Aspect 40 includes where determining the count as the maximum number of candidate beams is based on determining a scheduling offset, between transmitting a grant scheduling the DL RS and transmitting the DL RS, exceeds a threshold.

In Aspect 42, the method of Aspect 41 includes receiving, from the UE, an indication of the maximum number of candidate beams.

Aspect 43 is a method for wireless communication at a UE including receiving, from a base station, a beam indication configuration that associates a plurality of downlink beams with a plurality of antenna panels associated with the UE, receiving, from the base station, via a first antenna panel of the plurality of antenna panels, based on whether the beam indication configuration associates a downlink beam of the plurality of downlink beans with the first antenna panel, a DL RS via the downlink beam, perform one or more measurements of the downlink beam based on receiving the DL RS, and one of transmitting, to the base station, a beam report including the one or more measurements of the downlink beam, or performing, based on the one or more measurements, a beam refinement operation using the downlink beam.

In Aspect 44, the method of Aspect 43 includes where receiving the DL RS at the one of the plurality of antenna panels is based on the beam indication configuration associating the downlink beam with the at least one of the plurality of antenna panels.

In Aspect 45, the method of any of Aspects 43 or 44 includes where receiving the beam indication configuration includes receiving the beam indication configuration in at least one of RRC signaling, a DCI, or MAC-CE.

In Aspect 46, the method of any of Aspects 43 to 45 includes where receiving the DL RS at the one of the plurality of antenna panels is based on the beam indication configuration associating the downlink beam with a different antenna panel.

In Aspect 47, the method of Aspect 46 includes where receiving the DL RS at the one of the plurality of antenna panels is based at least in part on a DL RS configuration of the DL RS.

In Aspect 48, the method of Aspect 47 includes where the one of the plurality of antenna panels is a previous antenna panel associated with a previous beam report transmitted to the base station.

In Aspect 49, the method of any of Aspects 43 to 48 includes where the beam indication configuration indicates downlink or joint downlink and uplink TCI states, each having an associated antenna panel.

In Aspect 50, the method of any of Aspects 43 to 49 includes receiving, from the base station, a beam report configuration indicating to transmit the beam report for the downlink beam.

In Aspect 51, the method of Aspect 50 includes where receiving the DL RS at the one of the plurality of antenna panels includes receiving, based on the configuration, the DL RS at any one of the plurality of antenna panels.

Aspect 52 is a method for wireless communication at a base station including transmitting, to a UE, a beam indication configuration that associates a plurality of downlink beams with a plurality of antenna panels at the UE, transmitting, to the UE, a beam report configuration indicating a parameter for determining, based on the beam indication configuration, one of the plurality of antenna panels at the UE to use in performing one or more measurements of a downlink beam from the base station, and transmitting, by the base station, a DL RS using the downlink beam to the UE.

In Aspect 53, the method of Aspect 52 includes transmitting, to the UE, the beam indication configuration in at least one of RRC signaling, a DCI, or MAC-CE.

In Aspect 54, the method of any of Aspects 52 or 53 includes where the beam report configuration specifies, where the beam indication configuration indicates the downlink beam as associated with the one of the plurality of antenna panels, whether to use the one of the plurality of antenna panels in measuring the downlink beam or whether to use any of the plurality of antenna panels in measuring the downlink beam.

In Aspect 55, the method of any of Aspects 52 to 54 includes where the beam report configuration specifies, where the beam indication configuration does indicate the downlink beam as associated with the one of the plurality of antenna panels, whether to use a previous antenna panel configured for measuring a previous downlink beam in measuring the downlink beam or whether to use any of the plurality of antenna panels in measuring the downlink beam.

In Aspect 56, the method of any of Aspects 52 to 55 includes where the beam indication configuration indicates downlink or joint downlink and uplink TCI states, each having an associated antenna panel.

In Aspect 57, the method of any of Aspects 52 to 56 includes receiving, from the UE and based on the parameter, a beam report including, for the downlink beam, the signal metric measured of the downlink beam.

Aspect 58 is an apparatus for wireless communication including a transceiver, a memory configured to store instructions, and one or more processors communicatively coupled with the transceiver and the memory, where the one or more processors are configured to execute the instructions to perform the operations of one or more methods in any of Aspects 1 to 57.

Aspect 59 is an apparatus for wireless communication including means for performing the operations of one or more methods in any of Aspects 1 to 57.

Aspect 60 is a computer-readable medium including code executable by one or more processors to perform the operations of one or more methods in any of Aspects 1 to 57.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may include A only, B only, C only, A and B only, A and C only, B and C only, or A and B and C, where any such combinations may contain one or more members of any of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

What is claimed is:

1. An apparatus for wireless communication, comprising:
a transceiver;
a memory configured to store instructions; and
one or more processors communicatively coupled with the transceiver and the memory, wherein the one or more processors are configured to:
receive, from a base station, a beam indication configuration that associates a plurality of downlink beams with a plurality of antenna panels associated with the apparatus;
receive, from the base station, via a first antenna panel of the plurality of antenna panels, based on the beam indication configuration associating a downlink beam of the plurality of downlink beams with a different antenna panel or no antenna panel, a downlink (DL) reference signal (RS) via the downlink beam;
perform one or more measurements of the downlink beam based on receiving the DL RS; and
one of:
transmit, to the base station, a beam report including the one or more measurements of the downlink beam; or
perform, based on the one or more measurements, a beam refinement operation using the downlink beam.

2. The apparatus of claim 1, wherein the one or more processors are configured to receive the beam indication configuration in at least one of radio resource control (RRC) signaling, a downlink control information (DCI), or media access control (MAC)-control element (CE).

3. The apparatus of claim 1, wherein the one or more processors are configured to receive the DL RS at the first antenna panel based at least in part on a DL RS configuration of the DL RS.

4. The apparatus of claim 3, wherein the first antenna panel is a previous antenna panel associated with a previous beam report transmitted to the base station.

5. The apparatus of claim 1, wherein the beam indication configuration indicates downlink or joint downlink and uplink transmission configuration indicator (TCI) states, each having an associated antenna panel.

6. The apparatus of claim 1, wherein the one or more processors are further configured to receive, from the base station, a beam report configuration indicating to transmit the beam report for the downlink beam.

7. The apparatus of claim 6, wherein the one or more processors are configured to receive the DL RS at the first antenna panel at least in part by receiving, based on the beam indication configuration, the DL RS at any one of the plurality of antenna panels.

8. A method for wireless communication at a user equipment (UE), comprising:
receiving, from a base station, a beam indication configuration that associates a plurality of downlink beams with a plurality of antenna panels associated with the UE;
receiving, from the base station, via a first antenna panel of the plurality of antenna panels, based on the beam indication configuration associating a downlink beam of the plurality of downlink beams with a different antenna panel or no antenna panel, a downlink (DL) reference signal (RS) via the downlink beam;
perform one or more measurements of the downlink beam based on receiving the DL RS; and
one of:
transmitting, to the base station, a beam report including the one or more measurements of the downlink beam; or
performing, based on the one or more measurements, a beam refinement operation using the downlink beam.

9. The method of claim 8, wherein receiving the beam indication configuration includes receiving the beam indication configuration in at least one of radio resource control (RRC) signaling, a downlink control information (DCI), or media access control (MAC)-control element (CE).

10. The method of claim 8, wherein receiving the DL RS at the first antenna panel is based at least in part on a DL RS configuration of the DL RS.

11. The method of claim 10, wherein the first antenna panel is a previous antenna panel associated with a previous beam report transmitted to the base station.

12. The method of claim 8, wherein the beam indication configuration indicates downlink or joint downlink and uplink transmission configuration indicator (TCI) states, each having an associated antenna panel.

13. The method of claim 8, further comprising receiving, from the base station, a beam report configuration indicating to transmit the beam report for the downlink beam.

14. The method of claim 13, wherein receiving the DL RS at the first antenna panel includes receiving, based on the beam indication configuration, the DL RS at any one of the plurality of antenna panels.

15. An apparatus for wireless communication, comprising:
a transceiver;
a memory configured to store instructions; and
one or more processors communicatively coupled with the transceiver and the memory, wherein the one or more processors are configured to:
transmit, to a user equipment (UE), a beam indication configuration that associates a plurality of downlink beams with a plurality of antenna panels associated with the UE;
transmit, to the UE, a beam report configuration indicating a parameter for determining, based on the beam indication configuration, one of the plurality of antenna panels at the UE to use in performing one or more measurements of a downlink beam from the apparatus, wherein the beam report configuration specifies, where the beam indication configuration indicates the downlink beam as associated with the one of the plurality of antenna panels, whether to use a specific antenna panel or any of the plurality of antenna panels in measuring the downlink beam; and
transmit a downlink (DL) reference signal (RS) using the downlink beam to the UE.

16. The apparatus of claim 15, wherein the one or more processors are configured to transmit, to the UE, the beam indication configuration in at least one of radio resource control (RRC) signaling, a downlink control information (DCI), or media access control (MAC)-control element (CE).

17. The apparatus of claim 15, wherein the beam report configuration specifies, where the beam indication configuration indicates the downlink beam as associated with the one of the plurality of antenna panels, whether to use the one of the plurality of antenna panels in measuring the downlink beam or whether to use any of the plurality of antenna panels in measuring the downlink beam.

18. The apparatus of claim 15, wherein the beam report configuration specifies, where the beam indication configuration does indicate the downlink beam as associated with the one of the plurality of antenna panels, whether to use a previous antenna panel configured for measuring a previous downlink beam in measuring the downlink beam or whether to use any of the plurality of antenna panels in measuring the downlink beam.

19. The apparatus of claim 15, wherein the beam indication configuration indicates downlink or joint downlink and uplink transmission configuration indicator (TCI) states, each having an associated antenna panel.

20. The apparatus of claim 15, wherein the one or more processors are further configured to receive, from the UE and based on the parameter, a beam report including, for the downlink beam, the one or more measurements of the downlink beam.

21. A method for wireless communication at a base station, comprising:
transmitting, to a user equipment (UE), a beam indication configuration that associates a plurality of downlink beams with a plurality of antenna panels associated with the UE;
transmitting, to the UE, a beam report configuration indicating a parameter for determining, based on the beam indication configuration, one of the plurality of antenna panels at the UE to use in performing one or more measurements of a downlink beam from the base station, wherein the beam report configuration specifies, where the beam indication configuration indicates the downlink beam as associated with the one of the plurality of antenna panels, whether to use a specific antenna panel or any of the plurality of antenna panels in measuring the downlink beam; and
transmitting, by the base station, a downlink (DL) reference signal (RS) using the downlink beam to the UE.

22. The method of claim 21, further comprising transmitting, to the UE, the beam indication configuration in at least one of radio resource control (RRC) signaling, a downlink control information (DCI), or media access control (MAC)-control element (CE).

23. The method of claim 21, wherein the beam report configuration specifies, where the beam indication configuration indicates the downlink beam as associated with the one of the plurality of antenna panels, whether to use the one of the plurality of antenna panels in measuring the downlink beam or whether to use any of the plurality of antenna panels in measuring the downlink beam.

24. The method of claim 21, wherein the beam report configuration specifies, where the beam indication configuration does indicate the downlink beam as associated with the one of the plurality of antenna panels, whether to use a previous antenna panel configured for measuring a previous downlink beam in measuring the downlink beam or whether to use any of the plurality of antenna panels in measuring the downlink beam.

25. The method of claim 21, wherein the beam indication configuration indicates downlink or joint downlink and uplink transmission configuration indicator (TCI) states, each having an associated antenna panel.

26. The method of claim 21, further comprising receiving, from the UE and based on the parameter, a beam report including, for the downlink beam, the one or more measurements of the downlink beam.

* * * * *